(12) United States Patent
Hopper

(10) Patent No.: US 6,805,314 B2
(45) Date of Patent: Oct. 19, 2004

(54) TOOL SUPPORT

(76) Inventor: Michael B. Hopper, 61 Sherbrook Ave., Worcester, MA (US) 01604

( * ) Notice: Subject to any disclaimer, the term of this patent is extended or adjusted under 35 U.S.C. 154(b) by 0 days.

(21) Appl. No.: 10/408,583

(22) Filed: Apr. 7, 2003

(65) Prior Publication Data

US 2003/0192974 A1 Oct. 16, 2003

Related U.S. Application Data

(63) Continuation-in-part of application No. 09/818,162, filed on Mar. 27, 2001, now abandoned.

(51) Int. Cl.[7] ............................................... B65H 75/48
(52) U.S. Cl. .................... 242/375.1; 242/376; 242/377; 242/399.1; 242/484; 242/380; 248/330.1
(58) Field of Search ............................. 242/375.1, 376, 242/377, 397.3, 399.1, 484, 484.1, 380; 248/579, 52, 330.1

(56) References Cited

U.S. PATENT DOCUMENTS

| | | | |
|---|---|---|---|
| 760,801 A | 5/1904 | Nichols | 242/377 |
| 2,070,196 A | 2/1937 | Black | 242/375.1 |
| 2,462,296 A | 2/1949 | Yirava | 242/377 |
| 2,702,674 A | 2/1955 | Willson et al. | 242/399.1 |
| 2,756,945 A | 7/1956 | Robboy | 242/375.1 |
| 3,062,476 A | 11/1962 | Griffitts | 242/375.1 |
| 3,075,724 A | 1/1963 | Stahmer | 242/376 |
| 3,093,342 A | 6/1963 | Krohn | 242/375.1 |
| 3,162,395 A | * 12/1964 | Bray | 242/402 |
| 3,305,103 A | 2/1967 | Hilstrom | 242/375.1 |
| 3,384,321 A | 5/1968 | Becker et al. | 242/375.1 |
| 3,615,065 A | 10/1971 | Elliott | 242/375.1 |
| 4,003,552 A | 1/1977 | Sobolewski | 242/375.1 |
| 4,655,399 A | 4/1987 | Harvey | 242/397.3 |
| 4,897,512 A | 1/1990 | Johnston | 242/377 |
| 5,054,162 A | 10/1991 | Rogers | 242/376 |
| 6,065,705 A | 5/2000 | Schmitt | 242/375.1 |

* cited by examiner

Primary Examiner—John M. Jillions
(74) Attorney, Agent, or Firm—Richard L. Sampson, Esq.

(57) ABSTRACT

A support assembly and method is provided for suspending lightweight tools or other objects, such as hairdryers and the like. The assembly provides support and in particular embodiments, electrical power to the object suspended. In addition, the assembly provides management of the cord. Elevation of the object may be adjusted within a predetermined range of motion. The assembly exerts an upward force on the object that varies depending upon the elevation. This variable force is calibrated to provide the object with a uniformly weightless or virtually weightless "feel" nominally throughout the range of movement. The assembly is provided with low friction and low inertia, so that an object may be rapidly and easily moved between various elevations with little effort and little drag. The amount of force exerted on the object by the assembly may be adjusted.

44 Claims, 12 Drawing Sheets

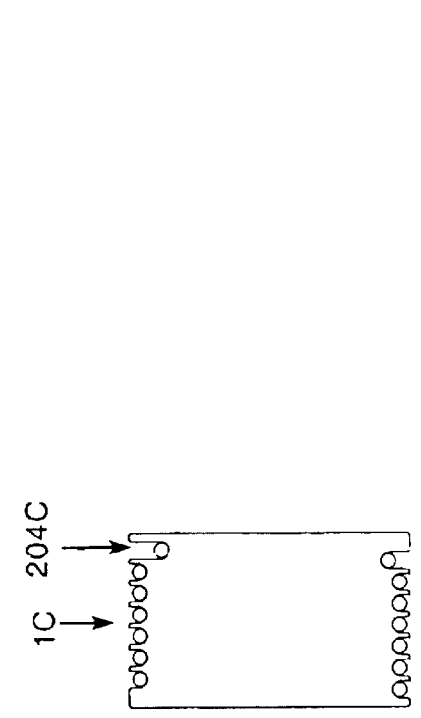
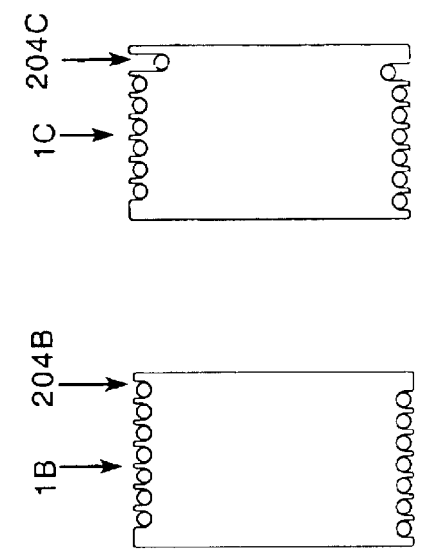
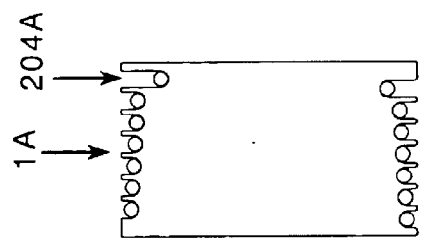
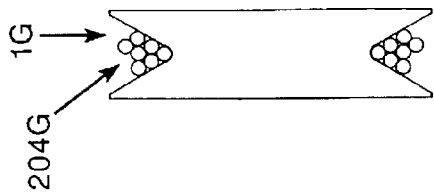
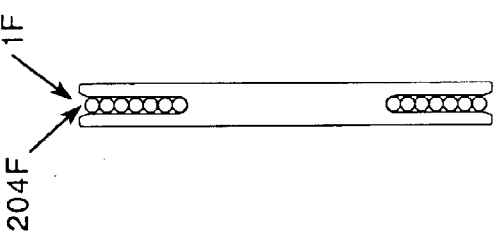
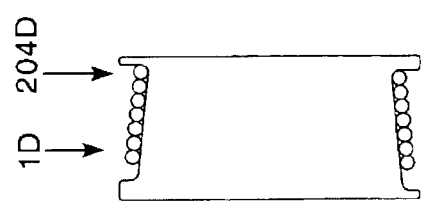
Fig. 12

TOOL SUPPORT

RELATED APPLICATION

This application is related to, and is a Continuation-In-Part of U.S. patent application Ser. No. 09/818,162, entitled Tool Support, filed on Mar. 27, 2001 now abandoned, which is fully incorporated herein by reference.

BACKGROUND

1. Technical Field

This invention relates to retractable overhead tool supports, and more particularly to a low-drag overhead support for lightweight hand-held tools such as hairdryers.

2. Background Information

In various industries, hand tools and other utilitarian devices are used by workers on a daily basis. Many of these devices are heavy, and require considerable arm strength to lift, hold in place, and maneuver. Weight compensating suspension devices may be desired to support relatively heavy objects from above, such as to support engine blocks and the like in automobile assembly lines. These devices enable the heavy objects to be conveniently moved to or along the production line, enabling workers to rotate them for convenient access, e.g., to attach components, or to lower them into position, such as into an engine compartment of an automobile. In order to support such heavy objects, these suspension devices may be fabricated from relatively heavy components to provide them with requisite structural integrity. These suspension devices, by virtue of their intended use and structural requirements, therefore tend to have relatively high inertial mass. Such devices also tend to exhibit relatively high frictional forces during use.

As mentioned above, the supported objects are themselves heavy and as such, are typically moved into desired position slowly, and once so positioned, e.g., at a desired elevation within an assembly line, or within an engine compartment of an automobile, are seldom moved elevationally again, if at all. Accordingly, for such applications, the mass, inertia, and friction of the suspension device is of little adverse affect.

However, such suspension devices are less than optimal for use with relatively lightweight objects, such as hairdryers and other hand tools, which have relatively low mass, and which are often moved rapidly between various elevations. For example, hair stylists use hand-held hair dryers, which often must be held for extended periods of time and maneuvered quickly and repetitively between various elevations, sometimes in tandem with a hairbrush while drying or styling.

Even when appropriately scaled down in size to compensate for the lighter weight of such objects, conventional suspension devices of the type described above have generally proven deficient in one or more respects. For example, such devices tend to either provide too much, or too little compensating (e.g., upward) force and the cords used to attach these devices to the supported object tend to bind during rapid elevational changes (i.e., during rapid raising and lowering). Furthermore, during such rapid elevational movement, such as during the hair styling/drying action described above, there may be a lag between raising the hairdryer, and the corresponding retraction of the cord. This lag may result in the cord becoming alternately loose, and then taut, to provide non-uniform tool support which may be disruptive to the user. Moreover, the momentary lag may result in a subsequent retraction at an excessive rate of speed, as the device attempts to reel in 'slack' in the cord. Alternatively, the device may attempt to retract the cord even as the user attempts to lower the object, which may be further disruptive, and may place undue stress on the user's wrist and on various components of the suspension device, etc. This uneven application of force generated by such a lag may also result in components of the device disadvantageously cocking or jamming.

It is therefore desirable to provide an improved suspension apparatus for lightweight objects such as hairdryers and other hand tools, which renders them apparently or virtually weightless, while enabling them to be frequently and quickly moved between various elevations while also providing lateral freedom of movement.

SUMMARY OF THE INVENTION

In one aspect of the present invention, a multi-elevational hairdryer support includes a frame configured for mounting to a ceiling, and a drum rotatably coupled to the frame for rotation about a central axis, the drum having an exterior frusto-conical surface. A helical channel extends along the frusto-conical surface, a coiled spring is disposed to bias rotation of the drum, and a cord is coupled at a proximal end thereof to the drum. A hairdryer is coupled to a distal end of the cord, which is configured to supply electrical power to the hairdryer. The helical channel windingly receives the power cord therein, so that it may be alternately wound and unwound with and against the bias of the spring as the hairdryer is respectively raised and lowered. The drum is configured for moving axially during the alternate winding and unwinding. The cord alternately exits and enters the helical channel via an axially stable point during the alternate unwinding and winding. The spring is coupled to the drum at an axially stationary location which is orthogonally aligned with the entry and exit point relative to the axis. The spring is also configured for remaining axially stationary during the axial movement of the drum.

In another aspect of the invention, a low-drag counterbalance apparatus is provided for offsetting a constant force between two points of reference, over a range of movement, the points of reference respectively defining a point of attachment to the force and an axis of rotation. The apparatus includes a drum configured to rotate about the axis of rotation, and a spring operatively engaged with the drum to bias rotation of the drum, the drum having a surface defining a helical path thereon. A cord is coupled at a proximal end thereof to the drum, the cord being coupled at a distal end thereof to the force. The cord is configured to be alternately wound and unwound about the drum along the helical path during the rotation of the drum, respectively with and against the bias. An entry/exit location is provided, where the cord alternately engages and disengages the drum during the winding and unwinding; and the entry/exit point and the spring are configured for being axially stationary relative to one another during the winding and unwinding.

In a yet further aspect of the invention, a low-drag multi-elevational hairdryer support includes a frame configured for mounting to a ceiling, a shaft disposed on the frame, low-friction rolled threads disposed along a first portion of the shaft, a substantially smooth low-friction spring support disposed concentrically with an other portion of the shaft, the spring support having a lubricious outer surface configured to slidably support a spring concentrically disposed therewith. A drum is provided with an integral self-lubricating inner threaded bore, the threaded bore disposed in rotational engagement with the low-friction rolled threads, the drum also having an exterior frusto-conical surface. A helical path extends along the frusto-conical surface, and a coiled spring is disposed to bias rotation of the drum, the spring having a first number of coils concentrically superposed with the spring support, and disposed in axially spaced relation to one another, so that the coils are free from mutual engagement during rotation of the drum. The helical path extends for a second number of revolutions about the drum, so that the ratio of the first number of coils to the second number of revolutions is at least 11:1. A cord is coupled at a proximal end thereof to the drum, and a hairdryer is coupled to a distal end of the cord, the cord configured to supply electrical power to the hairdryer. The helical path is configured to windingly receive the cord thereon, the cord configured for being alternately wound and unwound with and against the bias of the spring as the hairdryer is respectively raised and lowered. The support has a drag force opposing elevational movement of the hairdryer of less than 0.5 pounds (0.2 kg).

Aspects of the invention also include a method for offsetting a constant force between two points of reference, over a range of movement, the points of reference respectively defining a point of attachment to the force and an axis of rotation. The method includes configuring a drum to rotate about the axis of rotation, operatively engaging a spring with the drum to bias rotation of the drum, providing a surface defining a helical path thereon, and coupling a proximal end of the cord to the drum. The method further includes configuring a distal end of the cord for coupling to the force, configuring the cord for being alternately wound and unwound about the drum along the helical path during the rotation of the drum, respectively with and against the bias, providing an entry/exit location where the cord alternately engages and disengages the drum during the winding and unwinding; and configuring the entry/exit point and the spring for being axially stationary relative to one another during the winding and unwinding.

In another aspect of the invention, a multi-elevational hairdryer support includes a drum disposed to rotate about a central axis. A coiled spring is disposed to bias rotation of the drum, and a cord is coupled at a proximal end thereof to the drum. A hairdryer is coupled to a distal end of the cord, which is configured to supply electrical power to the hairdryer. The drum windingly receives the power cord thereon, so that it may be alternately wound and unwound with and against the bias of the spring as the hairdryer is respectively raised and lowered. The drum is configured for moving axially during the alternate winding and unwinding. The cord alternately exits and enters the helical channel via an axially stable point during the alternate unwinding and winding. The spring is coupled to the drum at an axially stationary location which is orthogonally aligned with the entry and exit point relative to the axis. The spring is also configured for remaining axially stationary during the axial movement of the drum.

In a still further aspect, an adjustable apparatus is provided for offsetting the weight of a hairdryer and cord over a range of movement. The apparatus includes a drum configured to rotate about an axis of rotation, a spring operatively engaged with the drum to bias rotation of the drum, and a cord coupled at a proximal end thereof to the drum, the cord coupled at a distal end thereof to the hairdryer. The cord is configured to be alternately wound and unwound about the drum, respectively with and against the bias. A tension adjuster is coupled to the spring, and is configured to adjust the bias over a range of from 0–100% of the weight of the hairdryer and cord.

BRIEF DESCRIPTION OF THE DRAWINGS

The above and other features and advantages of this invention will be more readily apparent from a reading of the following detailed description of various aspects of the invention taken in conjunction with the accompanying drawings, in which:

FIGS. 12A–12G are elevational schematic views of various drum configurations useful in accordance with various embodiments of the present invention.

DETAILED DESCRIPTION

Figure 1:
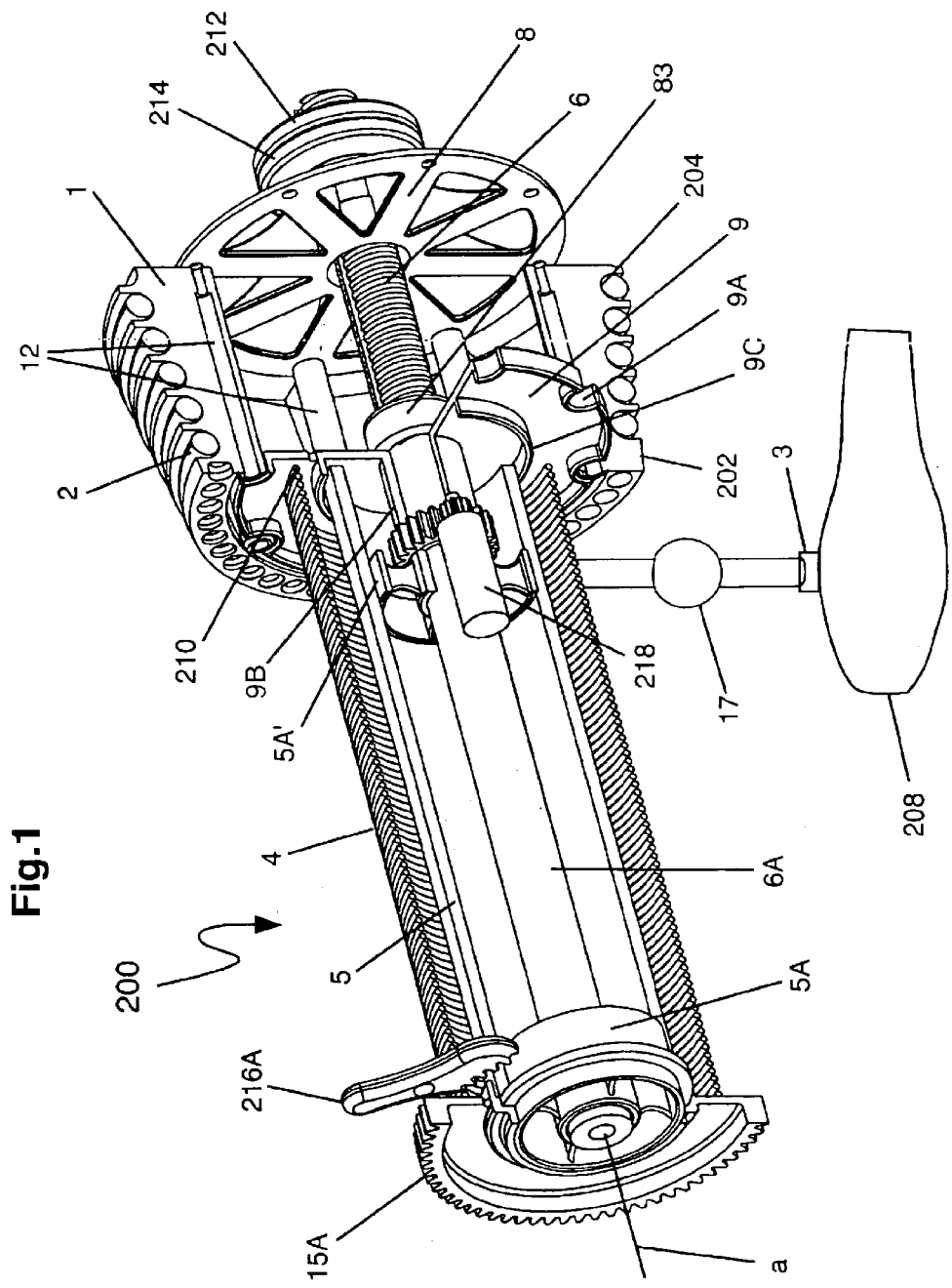
FIG. 1 is an elevational view of an embodiment of the present invention, in conjunction with a hairdryer shown on a reduced scale.

In the following detailed description, reference is made to the accompanying drawings that form a part hereof, and in which is shown by way of illustration, specific embodiments in which the invention may be practiced. These embodiments are described in sufficient detail to enable those skilled in the art to practice the invention, and it is to be understood that other embodiments may be utilized. It is also to be understood that structural, procedural and system changes may be made without departing from the spirit and scope of the present invention. The following detailed description is, therefore, not to be taken in a limiting sense, and the scope of the present invention is defined by the appended claims and their equivalents. For clarity of exposition, like features shown in the accompanying drawings shall be indicated with like reference numerals and similar features as shown in alternate embodiments in the drawings shall be indicated with similar reference numerals.

Where used in this disclosure, the term "axial" when used in connection with an element described herein, refers to a direction relative to the element, which is substantially parallel to axis of rotation a when the element is installed such as shown in FIG. 1. Similarly, the term "transverse" refers to a direction substantially orthogonal to the axial direction. The term "drag", as used herein, refers to forces tending to resist the elevational changes of an object supported by embodiments of the present invention. These "drag" forces may include friction and inertia exhibited by various components of these embodiments.

An aspect of the present invention was the realization that lack of success using conventional counter-balancing suspension systems was related to the relatively high drag, e.g., inertia and friction, associated with such devices. Moreover, it was found that even when such systems are scaled-down in size in an attempt to accommodate lighter weight (e.g., about 1–25 lbs.) suspended objects, the drag forces become a significant, if not overwhelming factor, particularly for objects in the lower end of this weight range. Indeed, although various componentry may be reduced in size to compensate for lighter weight objects, the drag forces generated by friction and inertia of the moving components, were not proportionately reduced. As such, the ratio of drag forces to the weight of the object became unacceptably high, with the effect of exacerbating the 'lagging' problem associated with quick elevational movements as described hereinabove.

Embodiments of the present invention address the aforementioned drawbacks by providing a low drag (low inertia, low friction) aerial suspension system configured for nominally weightlessly supporting a lightweight object (i.e., in the range of about 1 to about 25 pounds, and in particular embodiments, about 1–5 pounds), including hairdryers and other hand tools, to enable rapid elevational movements. In addition, these embodiments provide a convenient system for controlling power cords associated with such tools, since any excess cord not needed to support the object in its current position is coiled automatically. The cord is managed to nominally eliminate binding during extension, nor bunching during retraction. These embodiments also provide nearly uniform compensatory (upward) force throughout the operational range of cord extension. These embodiments also provide for conveniently storing the suspended objects. For non-electrical objects, the electrical cord can be replaced with a support cord, and the mechanism for bringing power to the cord need not be present.

In addition, the amount of force necessary to extend the object may be adjusted. Applying a relatively slight amount of upward lift on the object may initiate retraction of the cord. Furthermore, cord retraction may be stopped at any position simply by removing the upward lift on the object. The object may be retracted to a preset "home" position that requires additional force to dislodge the object therefrom. Embodiments of the present invention also advantageously provide support for a tool such as a hairdryer, while providing it with six degrees of freedom (i.e., x, y, z, $\theta_x$, $\theta_y$, and $\theta_z$) of movement.

Figure 2:
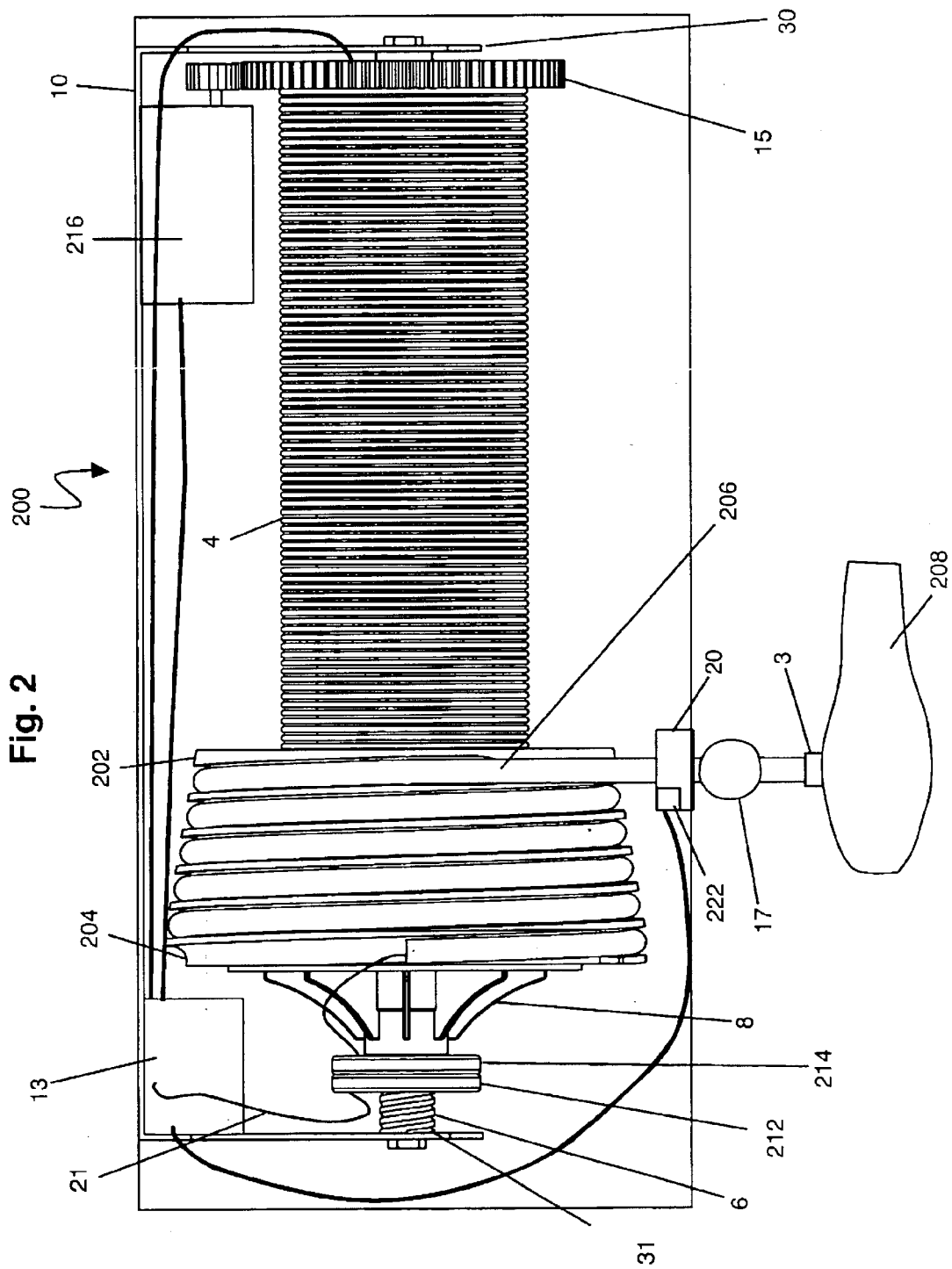
FIG. 2 is another view of the embodiment shown in FIG. 1.

Turning now to the Figures, one embodiment of the present invention is shown in FIGS. 1 and 2 as suspension system 200. System 200 includes a drum 1 configured to rotate about a central axis a and a spring 4 operatively engaged with the drum to bias rotation of the drum about the axis. Drum 1 includes an exterior surface 202, which, though not required, in the embodiment shown is substantially frusto-conical. Surface 202 defines a helical path 204 there across, which, in this particular embodiment, is configured in the form of a helical channel disposed within surface 202. Several alternative drum configurations, e.g., in which surfaces or portions thereof are not frusto-conical, and/or the paths or portions thereof are not helical or are not defined by a channel, are discussed hereinbelow with respect to paths 204B–204G of FIGS. 12B–12G.

As shown, a proximal end of a cord 2 is fastened to drum 1, and is configured for being alternately wound and unwound about drum 1 along helical path 204 as the drum rotates about axis a. During this winding and unwinding, cord 2 enters and exits path 204 (i.e., the cord engages and disengages the drum) at entry/exit point 206, and extends to a distal end fastened directly (or via a connector 3) to an object such as a hairdryer 208. In the particular embodiment shown, entry/exit point 206 and spring 4 are axially stationary relative to one another during the winding and unwinding of cord 2, and in this particular embodiment, both point 206 and spring 4 are axially stationary, e.g., while the drum slides axially, as discussed in greater detail hereinbelow. Thus, although point 206 will move axially relative to the drum 1 as the drum rotates, point 206 remains stationary relative to axis a and to a user. Such axial stability advantageously reduces the overall inertia (and thus lowers the drag) of apparatus 200 by minimizing both the number of moving parts and the extent of movement of those parts. This axial stability also nominally eliminates offset torque on the drum to further reduce drag on the apparatus.

Optional aspects of these embodiments include disposing the drum engaging portion 210 of spring 4 in substantial transverse (radial) alignment with entry/exit point 206. Such alignment effectively precludes the formation of an axially extending moment arm between the application of opposite, compensating, forces applied at these locations. The skilled artisan will recognize that such configuration will effectively minimize or substantially eliminate any propensity for the drum 1 and/or spring 4 to cock or twist relative to axis a during rapid elevational movements of the object.

Turning now to FIGS. 1 and 2 in greater detail, embodiment 200 may further include a mandrel 5, a thrust plate 8, a torque converter 9, a slip ring assembly 11, and a spring tension adjuster 15, all disposed on a threaded main shaft portion 6. As shown, thrust plate 8 may include a nut at its center, configured to threadably receive the threaded shaft portion 6 therein. Thrust plate 8 is rigidly coupled to drum 1 so that the drum rotates with plate 8 about shaft portion 6. As mentioned above, drum 1 may include a frusto-conical exterior surface 202, which optionally includes a helical channel 204 configured to receive a suitably sized cord 2 therein.

In desired embodiments, drum 1 is formed as a hollow annulus, with an interior surface having a plurality of axially extending bearing rods 12 disposed in spaced relation thereon. As also shown, torque converter 9 is configured as a disc having a central sleeve 9B sized to slidably receive shaft portion 6 therein. Converter 9 also includes a series of circumferentially spaced cutouts 9A sized and shaped to slidably engage the bearing rods 12. This sliding engagement of the rods 12 with the cutouts 9A serves to rotationally couple drum 1 to the torque converter 9, while enabling the drum 1 to slide axially relative to the converter 9. Moreover, the sliding fit of sleeve 9B enables torque converter 9 to rotate relative to shaft portion 6, without traveling axially relative thereto. Axial movement may be prevented, for example, by use of retainer clips 80. Torque converter 9 also includes a circular ridge 9C concentric with the main shaft portion 6. The radially innermost edge of the circular ridge 9C is sized to matingly engage one end of mandrel 5, while the radially outermost edge of the circular ridge 9C may be sized to matingly engage with an inner diameter of one end of spring 4 (FIG. 2). The ridge 9C and/or spring 4 are preferably sized and shaped to provide a snug fit, and the spring is securely attached thereto in any convenient manner sufficient to nominally prevent rotational slippage during operation, as discussed hereinbelow. A support bracket 10 (as shown in FIG. 2) may be used to hold the drum 1 and spring 4 in their desired positions relative to one another.

Figure 7:
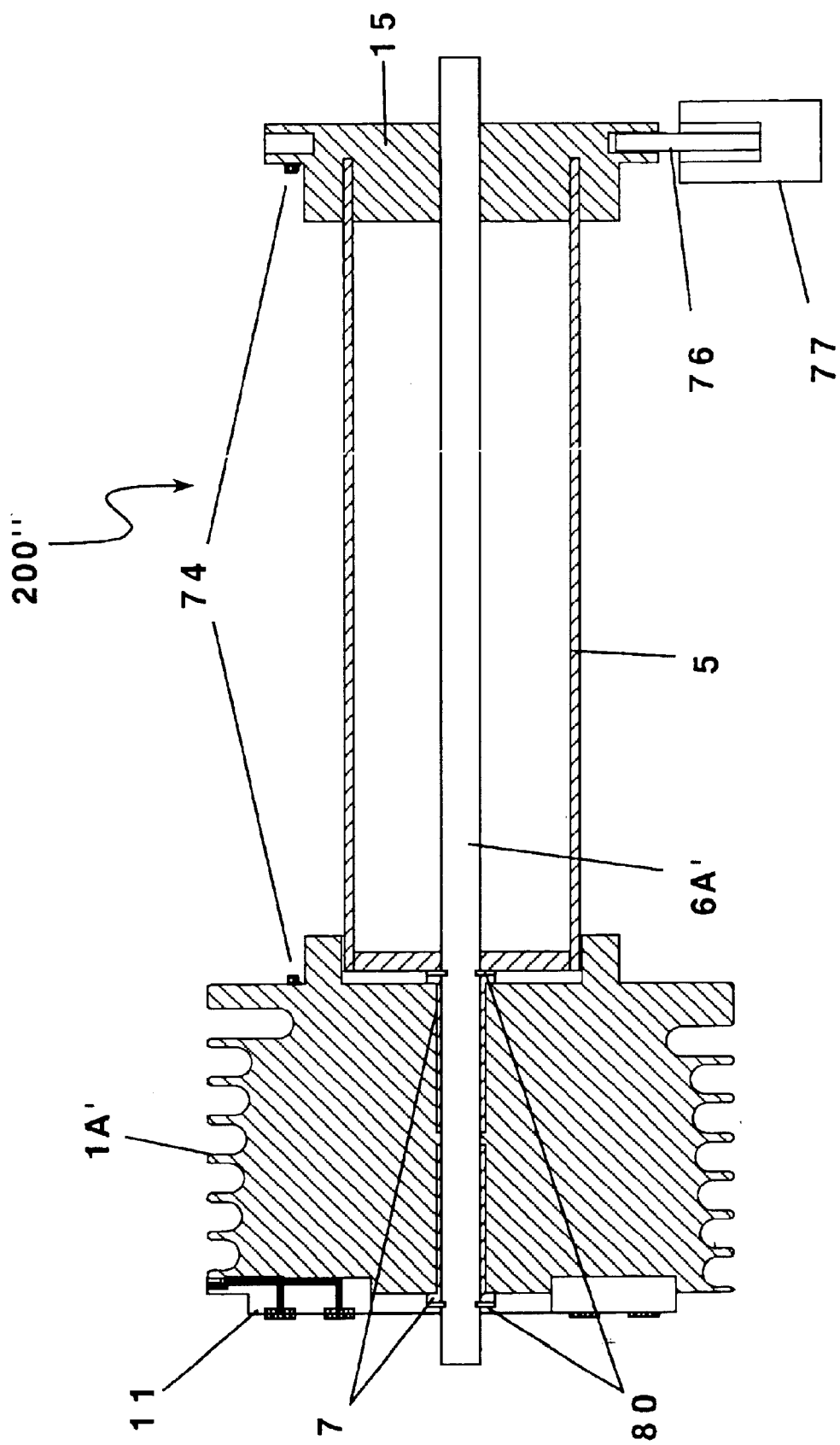
FIG. 7 is an elevational cross-sectional view of portions of the embodiment shown in FIG. 5.

As discussed hereinabove, the frusto-conical surface 202 of drum 1 may be provided with a helical channel 204 configured to hold the cord 2 in a wrapping configuration as shown in FIG. 2. As shown, the radius of frusto-conical surface 202, and of the helix formed by channel 204, increases gradually along the length of the drum. The skilled artisan will recognize that this progressive radius of channel 204 advantageously enables the weight of tool (e.g., hairdryer) 208 to provide progressively increased torque to drum 1 as the cord is unwound, to compensate for increased torque generated by spring 4 as it is moved against its bias. Such compensation may advantageously be used to maintain a substantially neutral or weightless feel to tool 208 during operation of system 200, as will be discussed in greater detail hereinbelow. The radius of path 204 at particular axial locations may be determined by the particular spring 4 used, the weight of a particular tool 208, and the added weight of the unwound portion of the cord 2 as it is extended. Moreover, in particular embodiments, the radius may decrease relatively dramatically at the smallest diameter portion of the drum to help retract the tool into the stowed position, as best seen in FIG. 7.

In the embodiment shown, drum 1 and entry/exit point 206 move axially relative to one another during winding and unwinding. In the particular embodiment shown in FIGS. 1 and 2, this is accomplished by the threaded engagement of thrust plate 8 with the threads of shaft portion 6, so that the drum travels axially along shaft 6 as it rotates. The magnitude of axial movement is determined by the pitch of the threads, which is configured so that the cord 2 will not complete a rotation on top of itself, and thus nominally keep it from binding or jamming as it winds and unwinds. In the particular embodiment shown, the thread pitch is configured to match that of the helical path 204 so that the entry/exit point 206 remains radially aligned with the path 204 throughout the range of drum rotation.

In particular embodiments, threads of shaft portion 6 may be configured as conventional multiple start (e.g., 5-start) threads, as may be desired to support the drum.

Figure 5:
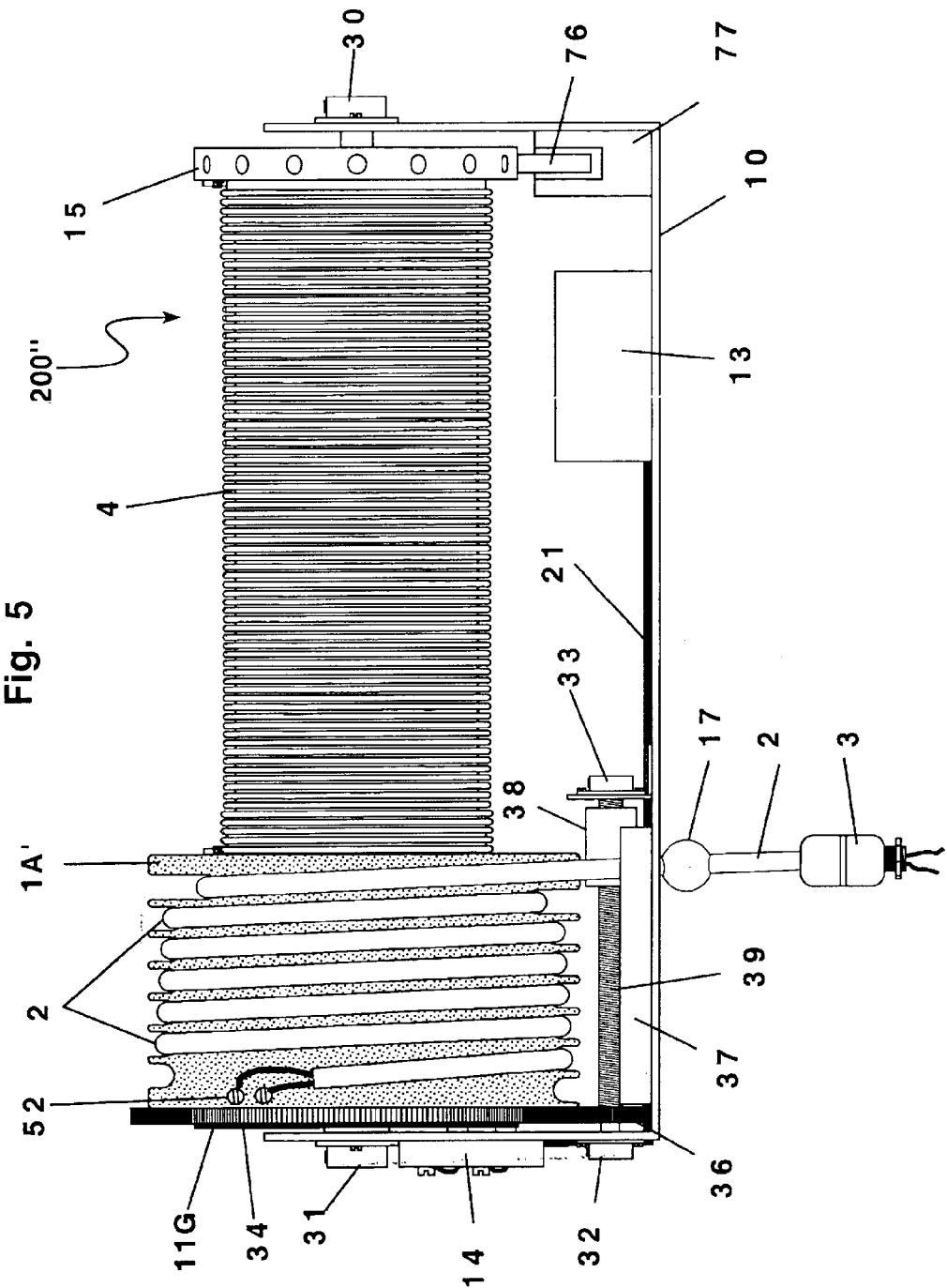
FIG. 5 is an elevational view of another embodiment of the present invention.
Figure 6:
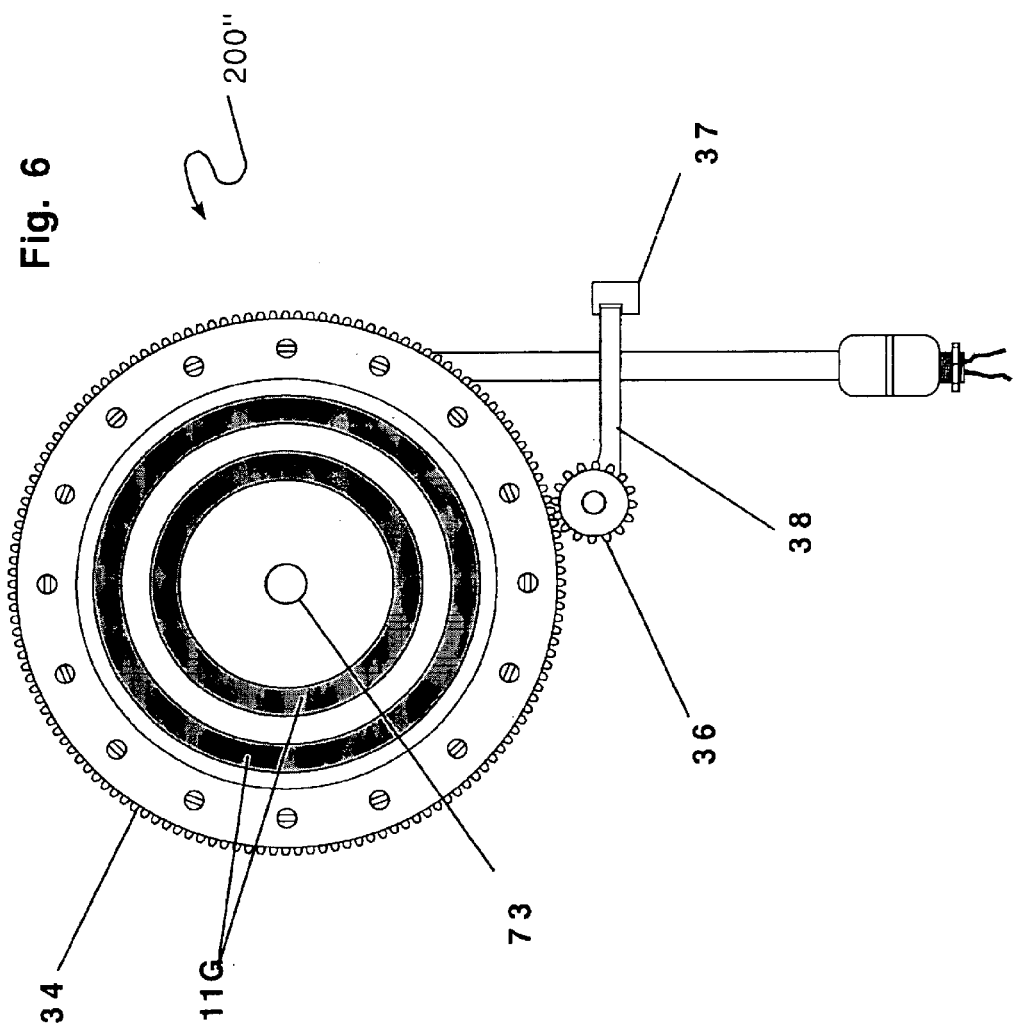
FIG. 6 is a front view of a portion of the embodiment shown in FIG. 5.

In embodiments in which the cord 2 is an electrical cord, electricity may be transferred from a suitable source, such as a 110 volt AC line voltage source (not shown), to a conventional slip ring assembly 11 having a pair of slidably engagable rings 212, 214. In the embodiment shown, ring 212 does not rotate, but moves axially and may be connected to the source, while the other ring 214 may be integrally fastened to thrust plate 8 to rotate therewith. Ring 214 may then be connected to the proximal end of cord 2, such as by terminals 52 (FIG. 5). In this manner, electricity may be conveniently transferred from a stationary source to the rotatable portions of system 200. Optionally, as mentioned hereinabove, cord 2 may terminate at its distal end at an electrical plug-type connector 3, which enables a user to conveniently connect and disconnect the cord to tool 208. Moreover, although cord 2 has been described herein as an electrical cord, the skilled artisan will recognize that in the event the tool or object does not require connection to a remote electrical source, the cord may simply be used to suspend the tool. The term "cord" is thus not to be construed as limiting, and includes string, rope, chain, wire or other material of sufficient strength and dimension to fulfill the function herein described.

As also shown, mandrel 5 is disposed within spring 4, in spaced, concentric orientation therewith. Mandrel 5 is sized to support the center of the spring 4 during operation of system 200, to prevent the spring from oversagging at its central portion. In this regard, mandrel 5 may be provided with an outer diameter that is as large as possible, while still being smaller than the smallest inner diameter of the spring 4 when the spring 4 is wound to its operational limit (e.g., when the cord 2 is fully unwound from the drum 1). As mentioned hereinabove, the mandrel is supported at one end by ridge 9C of torque converter 9. The other end of mandrel 5 is supported by mandrel spacer 5A which has an inner bearing surface configured to rotatably engage unthreaded shaft portion 6A as shown. Optionally, one or more additional spacers 5A' may also be provided as desired to further support the mandrel 5. Spacer 5A is coupled to spring tension adjuster 15. Adjuster 15, once adjusted as described hereinbelow, is configured to be stationary during operation of system 200. This also effectively maintains mandrel 5 in stationary orientation during operation. In the embodiments shown, spring 4 is a coil torsion spring. The adjusting mechanism 15 adjusts the tension of spring 4 by either manually or automatically (e.g., with a suitable stepping motor assembly 216) rotating the end of the spring coupled to spacer 5A. Such rotation effectively applies a predetermined level of preload, either with or against the spring's bias, to enable a user to fine-tune the amount of force applied by the spring. In this manner, the spring tension may be adjusted depending upon the weight of the accessory 208. In desired embodiments, the configuration described herein advantageously enables adjuster 15 to adjust the force applied by spring 4 over a range of from 0–100 percent (%) of the combined weight of the accessory 208 and cord 2. These embodiments thus permit the compensating (e.g., upward) force to be adjusted within a range of from no compensation (the user feels the full weight of the accessory) to a net upward bias equal to its weight.

The characteristics of the spring 4 are chosen based on factors such as the weight of the accessory 208 to be suspended, the weight of the cord 2 as it is extended, and the radius of helical path 204. In addition, the number of coils of spring 4 is preferably chosen to so that the rotation of each individual coil during operation is minimized. For example, it has been found that springs having a number of coils that is at least eleven times the number of revolutions of path 202, i.e., a ratio of 11:1, is desirable. In such a configuration, during operation, the average rotation of each coil is less than one eleventh that of the drum. In particularly desirable embodiments, a ratio of about 20:1 may be used. A ratio of 30:1 or higher may also be used. It has also been found desirable to coat the spring with a self-lubricating material such as polytetrafluoroethylene (PTFE), e.g., TEFLON® (DuPont Corporation, Delaware) and/or configure the spring so that adjacent coils are spaced from one another, to nominally eliminate any friction therebetween. Various additional factors that tend to contribute to the low drag (low inertia, low friction) aspect of the present invention are discussed hereinbelow.

Having described an embodiment of the present invention, operation thereof will now be discussed. As mentioned above, object 208 may be moved elevationally within a predetermined range of motion defined by an upper starting position, in which the cord 2 may be nominally fully retracted, and a lowermost position, in which the cord 2 may be substantially fully extended. In the starting position, the object 208 is suspended from cord 2 which is fully retracted. The object 208 is either in equilibrium (i.e., net bias neither upwardly nor downwardly), or has a net upward bias (e.g., in the event a helical path 204A having reduced radius (FIGS. 3–5) is used) in this position. If the apparatus is used as only a cord control device, then the spring tension adjuster can be set so that the object can even have a net downward bias and the user feels the weight of the tool if preferred. As the user pulls on the object, the cord 2 is extended and the drum rotates about the main shaft 6, 6A. As the suspended tool 208 is drawn from system 200, the cord 2 unwinds, which rotates drum 1 and thrust plate 8 coupled thereto. Since the thrust plate 8 is threadably coupled to threaded shaft portion 6, as discussed above, this rotation serves to move the drum/plate assembly axially along the threaded main shaft portion 6. As the drum 1 rotates and travels, its bearing rods 12 slide axially relative to cutouts 9A of torque converter 9. This serves to rotate the torque converter, which in turn, winds the spring 4 against its bias. As discussed above, the increasing radius of helical path 204, in combination with the increased weight of the unwound cord 2, provides increased torque that effectively compensates for the increased torque generated by spring 4 as it winds, so that as perceived by a user, tool 208 remains virtually weightless as it is moved within its range of motion.

To reverse this action, a slight lift of suspended tool 208 enables spring 4 to unwind, i.e., in the direction of its bias. This unwinding effectively reverses the rotation of torque converter 9, which then rotates drum 1 and consequently the threaded thrust plate 8, causing the drum to travel axially back towards its starting position as cord 2 is wound onto path 204 of the drum. In operation, a tool such as a hairdryer is attached to the end of cord 2, optionally using connector 3. As mentioned hereinabove, depending upon the weight of the tool and/or the user's preference for the amount of resistance provided by the system, spring 4 may be adjusted by rotating spring tension adjuster 15 about axis a. Optionally, such adjustment may be made using motor assembly 216.

In this embodiment, the drum, thrust plate, and slip rings are nominally the only moving parts, and the (axial) length of the spring remains constant. This helps to prevent the spring from cocking and jamming as a spring of this type may have a tendency to do, if it were wound (or unwound) and stretched axially at the same time. In addition, as also discussed hereinabove, the pitch of helical path 204 and threads of shaft portion 6 may be matched, so that the entry/exit point 206 is axially stationary. This also helps to prevents the cord from jamming or binding.

As mentioned hereinabove, various aspects of this embodiment have been provided to minimize the amount of drag (e.g., friction and inertia) in system 200, to reduce such drag to below 0.5 lbs (0.2 kg), and in particular embodiments, as low as 3 ounces (0.08 kg), i.e., a level of force that is virtually imperceptible to most users, to enable its successful use with relatively lightweight tools 208, for example, those weighing less than about 25 lbs (11.4 kg), and in particular embodiments, those weighing between about 1–5 lbs (0.4–2.3 kg).

The friction of parts moving on the threaded shaft portion 6 is minimized by providing this shaft portion with rolled, rather than machined, threads. These rolled threads offer significantly less resistance than conventional machined threads since the sharp edges and microscopic machining burrs common to such conventional threads are substantially eliminated. In addition the rolled threads and/or the threads of thrust plate 8 may be coated with PTFE, e.g., TEFLON® or other suitable self-lubricating materials to further reduce their friction. Sliding components, such as cutouts 9A and sleeve 9B, may also be fabricated from self-lubricating, or otherwise lubricious or low friction materials such as DELRIN® (Dupont Corporation). Moreover, the moving components are preferably fabricated from relatively lightweight and structurally rigid materials, such as molded ABS. This advantageously reduces the inertial mass of the moving parts. Additional, optional functionality may be added to the present invention by adding a torque-adjusting motor assembly 216 to facilitate adjusting the resistance of spring 4 remotely, as discussed hereinabove. Controls for such an assembly 216 may be disposed on the suspended tool or on connector 3. In addition, a stow-away motor assembly 218, including a conventional gear train, may be coupled to shaft portions 6 or 6A, to raise and lower the tool remotely, for example in the event system 200 is installed on a high ceiling.

Moreover, in the embodiment shown, the threads are oriented so that extending (unwinding) cord 2 moves the drum axially towards unthreaded shaft portion 6A. However, the threads orientation (and the drum itself) may be reversed, so that the drum moves in the opposite axial direction during unwinding, without departing from the spirit and scope of the present invention.

Figure 3:
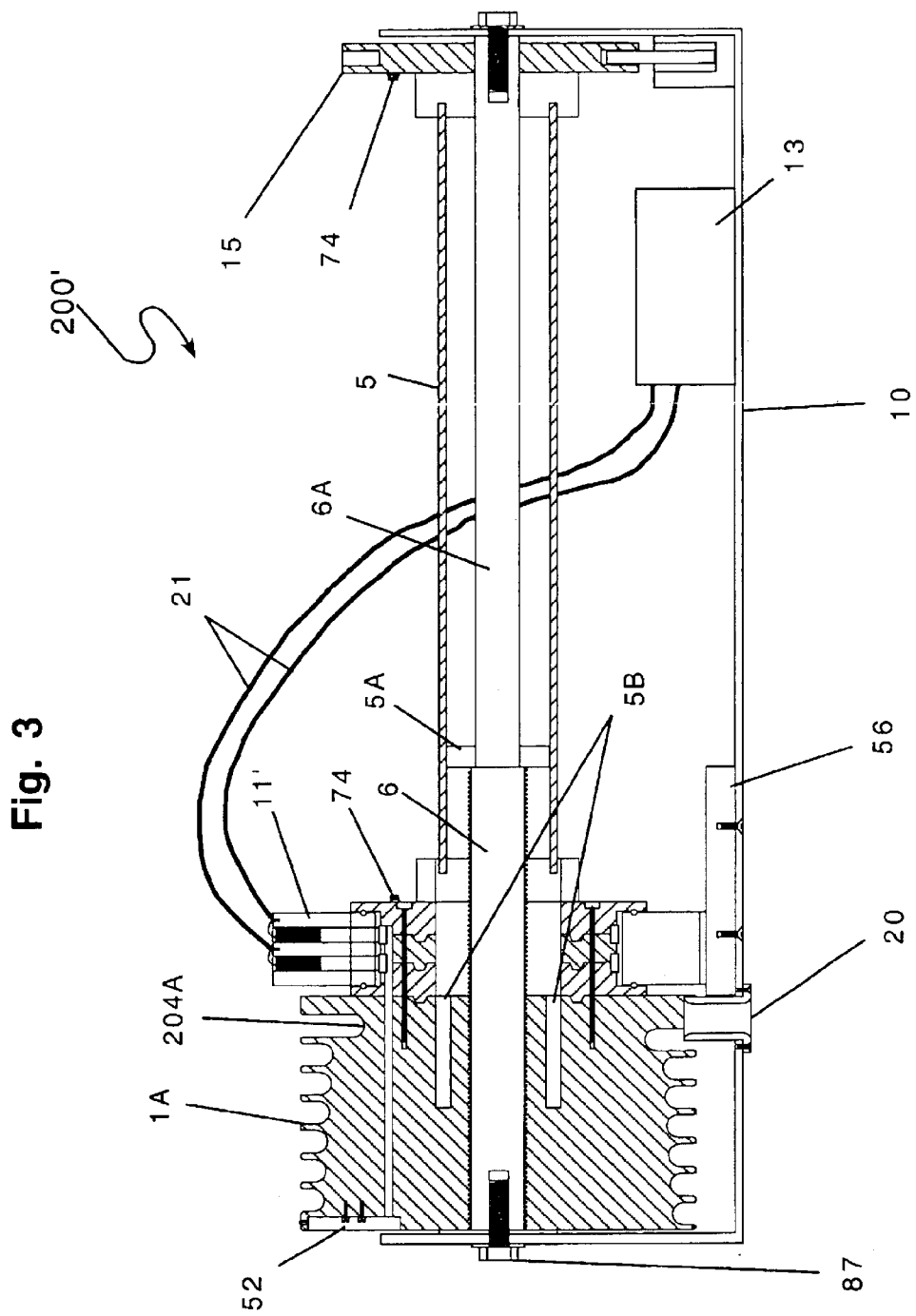
FIG. 3 is an elevational, cross-sectional view of portions of another embodiment of the present invention.
Figure 4:
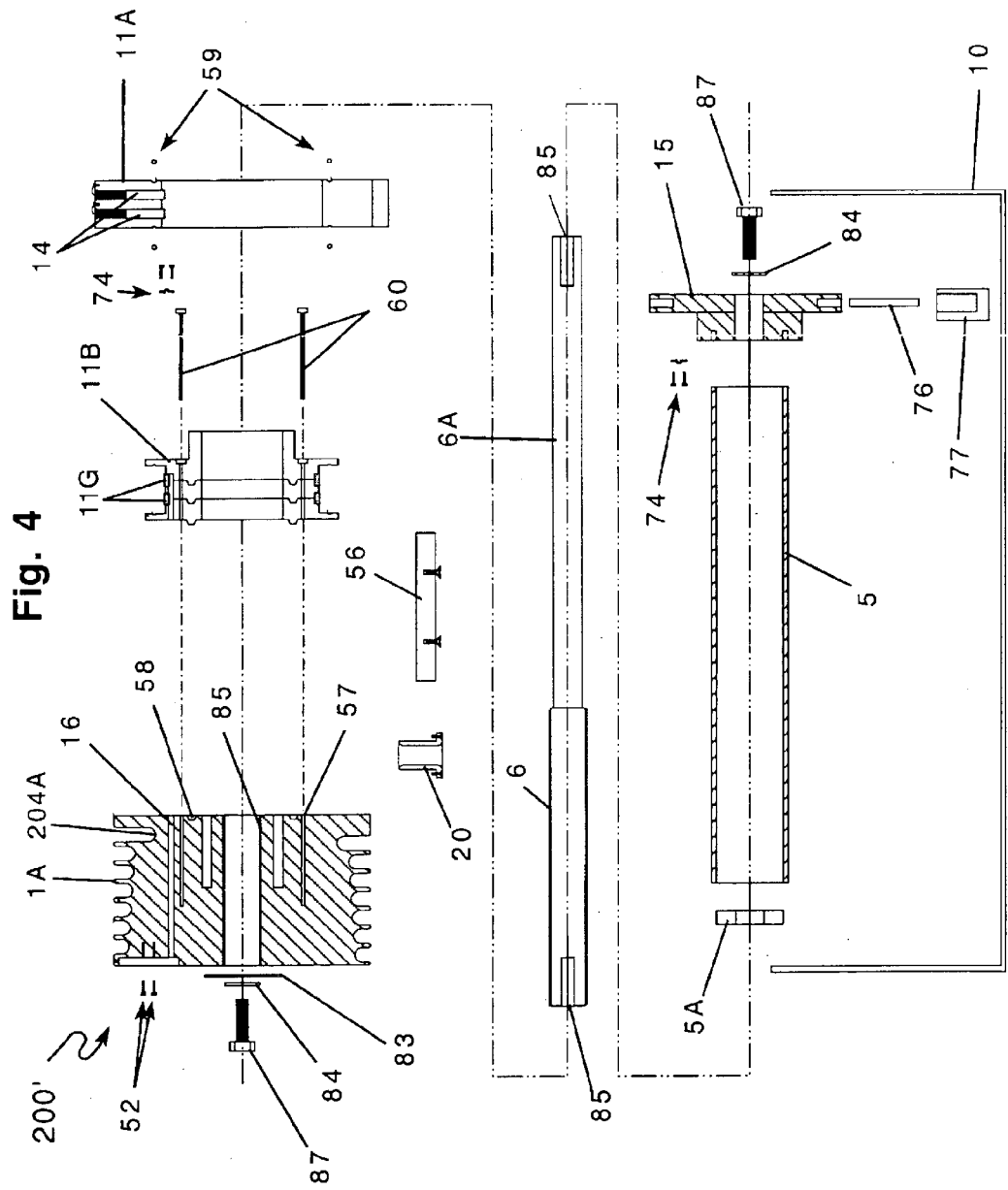
FIG. 4 is an exploded cross-sectional view of the embodiment of FIG. 3;.

Turning now to FIGS. 3–4, an alternate embodiment of the present invention is shown as system 200'. System 200' is in many respects similar or identical to system 200 described hereinabove, having distinctions which are discussed hereinbelow. In this embodiment, the main shaft, including portions 6, 6A, is supported by opposite ends of a support frame (e.g., bracket) 10, which includes an opening 20 disposed to align with entry/exit point 206 (FIG. 1). Although bracket 10 and opening 20 are shown with respect to system 200', the skilled artisan should recognize that these components, as well as one or more others shown and described with respect to this embodiment 200', may be interchangeably used with other embodiments, such as system 200, without departing from the spirit and scope of the present invention. The skilled artisan will recognize that use of bracket 10 advantageously enables the system 200, 200', etc., to be conveniently mounted, e.g., to a ceiling above a user's workstation.

One difference between system 200' and system 200 described hereinabove, is that rather than using a torque converter 9, in system 200' spring 4 is coupled directly to drum 1A. Thus, in this embodiment, spring 4 moves axially as drum 1A rotates. As shown, the threads of drum 1A and shaft portion 6 are oriented so that extension (unwinding) of cord 2 causes drum 1A to move axially towards mandrel 5, and retraction of the cord 2 causes the drum 1A to move outward away from the mandrel 5. Such a thread orientation advantageously compresses spring 4 axially as it is wound. Although such thread orientation may be reversed, such as in the manner discussed hereinabove with respect to system 200, such orientation would tend to axially stretch the spring as it is wound, which may be undesirable in some applications.

As also shown, an alternate slip ring assembly 11' may be used, being coupled to either (axial) end of the drum 1A. Slip ring assembly 11' includes an inner assembly 11B and an outer assembly 11A. The inner slip ring assembly 11B supports conventional slip (contact) rings 11G and is rigidly coupled to the drum 1A. The outer assembly 11A includes conventional brushes 14 configured to electrically engage rings 11G when assemblies 11A and 11B are rotationally coupled to one another in concentric, interfitting engagement as shown in FIGS. 3 and 4. Inner assembly 11B including slip rings 11G, rotates with the drum 1A, while outer assembly 11A the other portion containing the brushes 1A does not rotate. Assembly 11A may be kept from rotating by any suitable means, such as a notch or detent (not shown) configured to seat or otherwise engage assembly 11A with an non-rotating component, such as bar 56. Any suitable bearings, such as self-lubricating bearing material (e.g., TEFLON®) or ball bearings 59, may be used to effect the rotatable engagement of assemblies 11A, 11B, with one another. Electricity may be supplied to the brushes 14 of outer assembly 11A by wires 21 extending from electrical fixture box 13.

Figure 8:
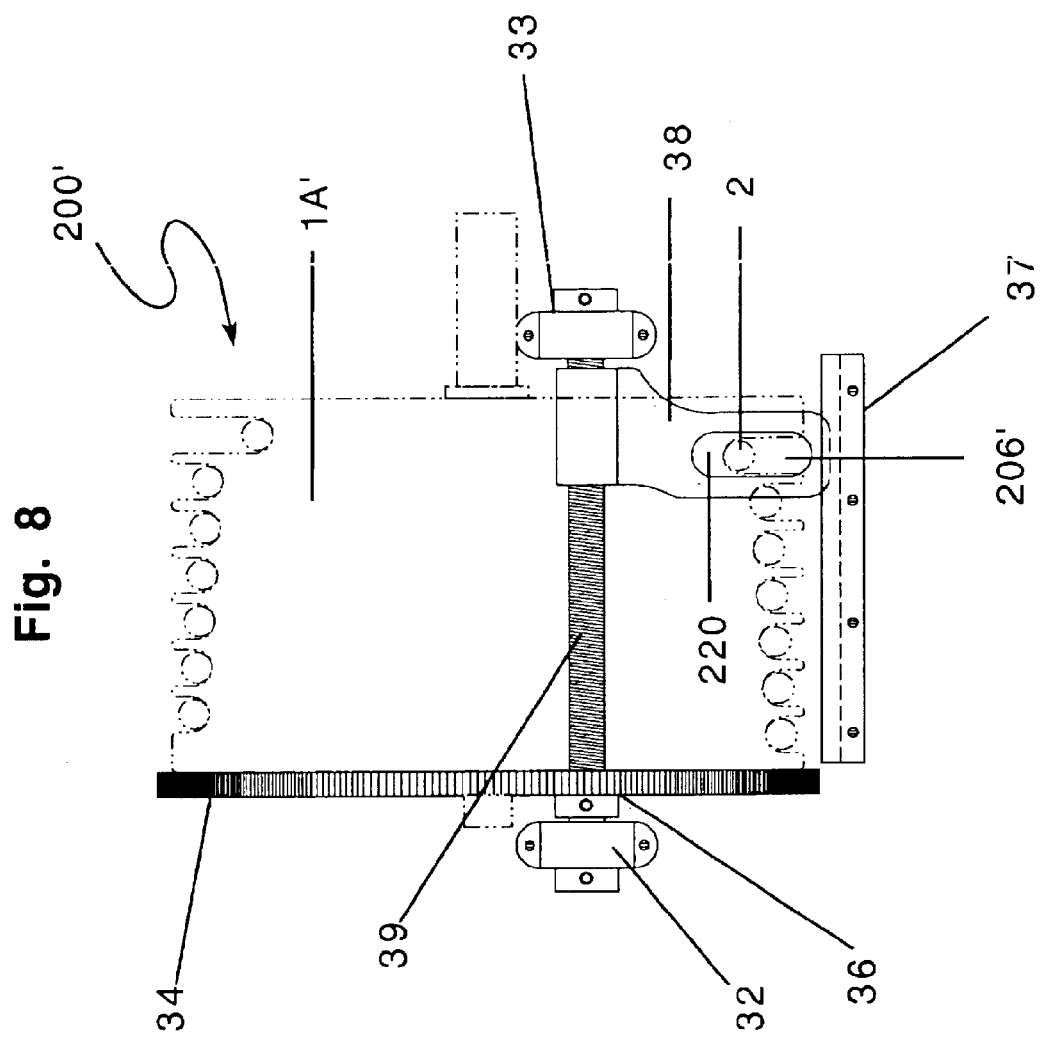
FIG. 8 is a top view, with portions shown in phantom, of portions of the embodiment of FIG. 5.
Figure 9:
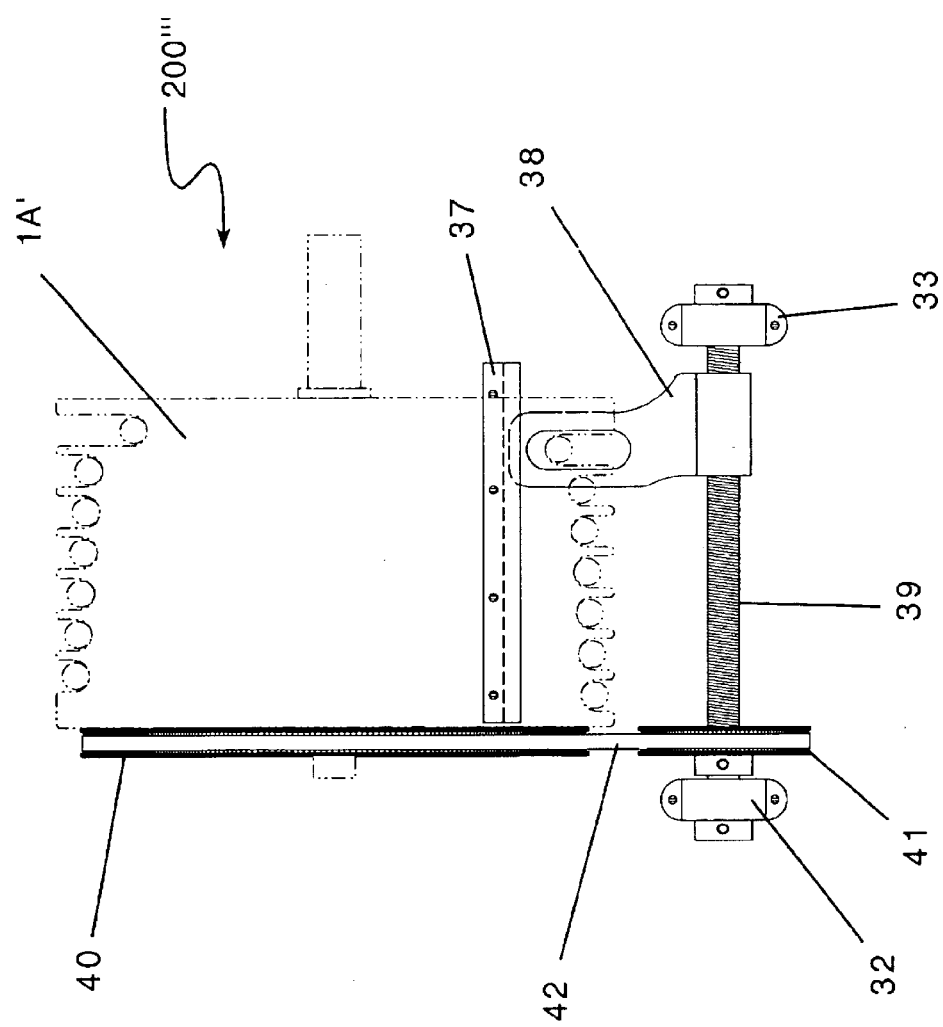
FIG. 9 is a view similar to that of FIG. 8, of portions of an alternative embodiment of the present invention.
Figure 10:
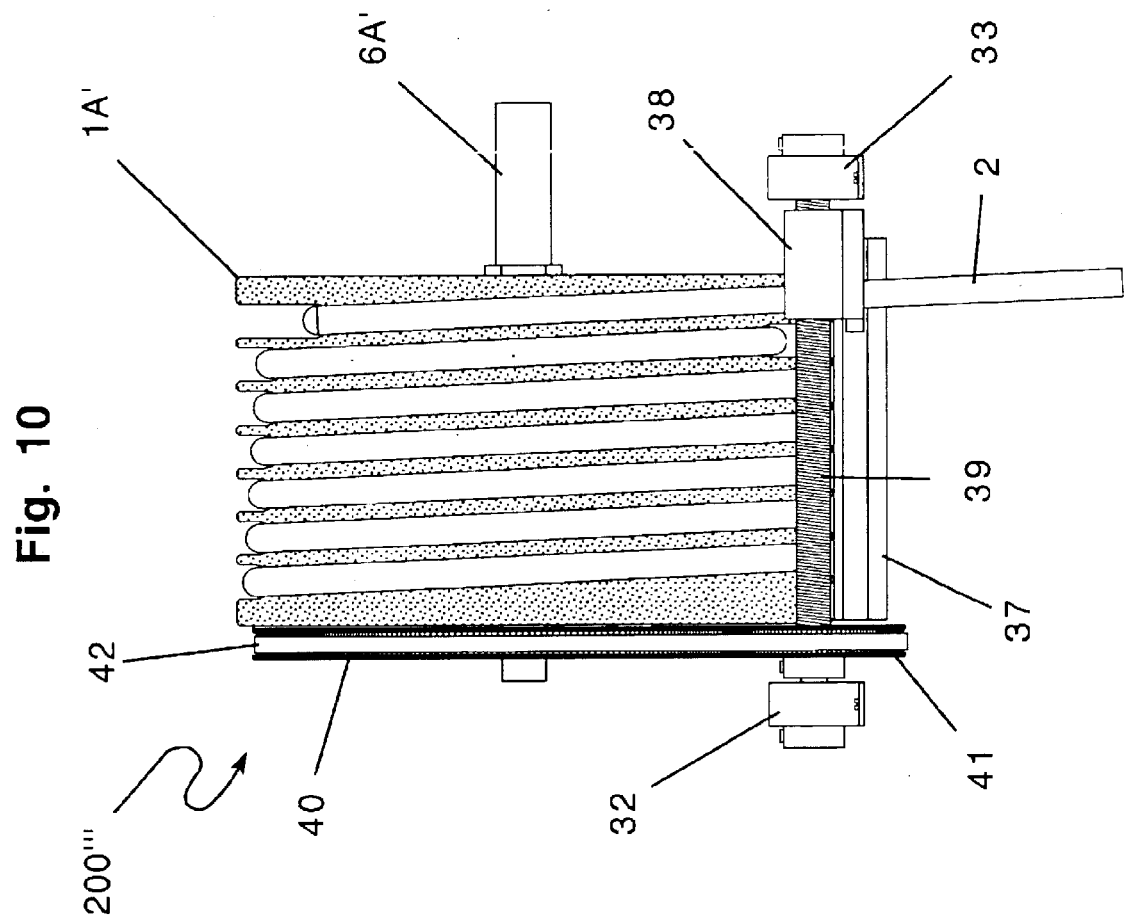
FIG. 10 is an elevational view of the embodiment of FIG. 9.
Figure 11:
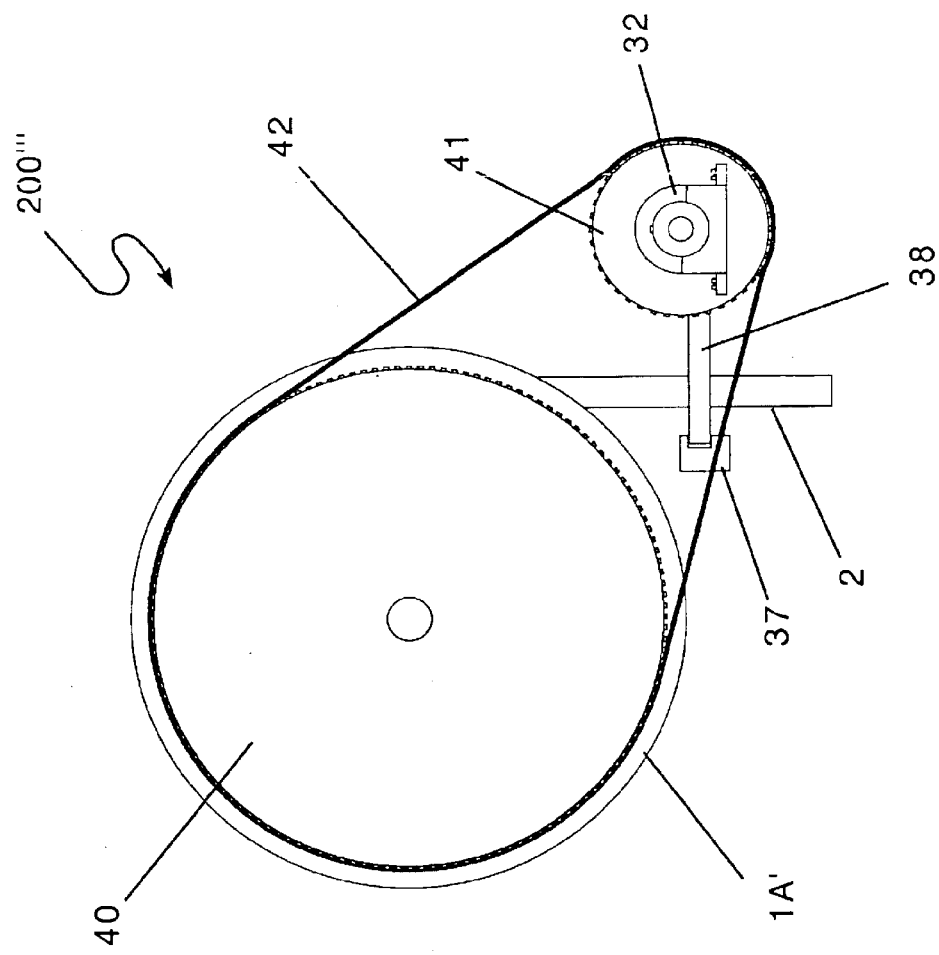
FIG. 11 is a front view of the embodiment of FIG. 10.

Various additional embodiments may include modifications and alternatives to the teachings of systems 200, 200', described hereinabove. Turning now to FIGS. 5–11, system 200", 200''' may be provided, which utilize alternative cord winding approaches including cord tracking mechanisms in combination with an axially stationary (rather than axially movable) drum 1A'. Such mechanisms may be gear-driven (FIGS. 5–8) or may be belt-and-pulley-driven (FIGS. 9–11). In both of these configurations, an unthreaded shaft 6A' is used. A threaded tracking screw shaft 39 is disposed (e.g., by a suitable gear train including gears 34 and 36 (FIGS. 5–8), or by a belt 42 and pulleys 40, 41 (FIGS. 9–11)) to axially move a tracking arm 38 during drum rotation. As best shown in FIG. 8, tracking arm 38 includes an opening 220 through which cord 2 extends, and which moves axially in tandem with entry/exit point 206' during drum rotation, to guide the cord as it winds and unwinds from helical path 204A. This guiding action of opening 220 helps to minimize any tendency of the cord to bind or wind over itself on drum 1A'.

As best shown in FIG. 7, in both the gear driven and pulley driven embodiments, a pair of conventional retainer clips 80 may be used to maintain drum 1A' in an axially stationary position. Suitable low resistance bearings 7 may be provided to allow the drum to freely rotate about the shaft 6A'. The mandrel 5 is held centered along its entire longitudinal length, as one end fits into a circular channel in the spring tension adjuster 15. Although drum 1A' rotates freely, mandrel 5 is not intended to rotate, but need not be secured in any fashion that prevents it from rotating. The retainer clip 80 disposed between drum 1A' and mandrel 5 acts as a spacer, to prevent any friction-generating contact between the drum 1A' and the end of the mandrel 5 as the drum rotates.

Turning back to FIGS. 5-8, during operation of the gear-driven tracking mechanism, as the cord 2 is wound on the drum 1A', the main tracking gear 34 drives the secondary tracking gear 36, which rotates screw shaft 39 about its longitudinal axis. This rotation moves tracking arm 38 axially. The diameters of gears 34, 36, and the pitch of the threads of shaft 39 are configured so that the tracking arm 38 moves axially at the same rate (and direction) as entry/exit point 206' during drum rotation, so that the cord 2, which passes through aperture 220, is properly guided during winding and unwinding, as discussed hereinabove. The skilled artisan will recognize that the belt-and-pulley-driven tracking mechanism, shown in FIGS. 9–11, is substantially similar to the gear-driven approach, but instead of gears 34 and 36, uses a main tracking pulley 40, secondary tracking pulley 41, and tracking belt 42.

As a further option, any of the various embodiments disclosed herein may be provided with a stop 17, such as shown in FIG. 5. The stop acts to prevent further retraction of cord 2 past a predetermined position, to define a 'home' position. As a yet further option, stop 17 may be magnetic, to magnetically engage a portion of frame 10 proximate the entry/exit position. Use of a magnetic stop 17 advantageously enables the use of relatively little upward bias (e.g., in the event the user desires little, if any, compensating force) while still holding the device 208 securely in a home position. The stop 17 is adjustable, so it can be positioned nominally anywhere along the cord, thus allowing the object to hang securely at any of various elevations when in its 'home' position. A switch 222 (FIG. 2), such as a conventional magnetically actuated switch, may also be provided to automatically turn on or cut off power to the device 208 when leaving or returning to the home position, respectively. The skilled artisan will also recognize that power to the device may alternately, or additionally, be controlled manually, such as by a switch located on device 208, on coupling 3 as discussed herein, and/or by any conventional remote control (not shown).

Turning now to FIGS. 12A–12G, additional optional drums suitable for use with any of the embodiments discussed hereinabove are shown. Although these Figures depict several optional drum configurations, they are not exhaustive. The skilled artisan will therefore recognize that drums of virtually any configuration, which are adapted for rotating about a central axis, to wind and unwind a cord thereon, may be provided without departing from the spirit and scope of the present invention. The drum designs selected for a particular implementation of the system 200, 200', etc., depends on choices such as the desired action of the object attached to the cord, whether it is desired for the drum to move axially as it rotates, and if not, whether use of a tracking mechanism is desired. For clarity, the drum variations shown in these FIGS. 12A–12G are oriented so the proximal end of the cord engages path 204 on the right hand side of each drum, and, in the event path 204 is helical, winding progresses towards the left hand side of the drum.

Moreover, although the path 204, 204A has been described hereinabove as being helical, as will be evident in light of the following, embodiments may be provided in which the path is not helical, but rather, the cord is permitted to wind upon itself, such as shown in FIGS. 12F and 12G. The skilled artisan should recognize that such non-helical paths remain within the spirit and scope of the present invention.

Turning to FIG. 12A, drum 1A, as discussed hereinabove, includes a helical path 204A in the form of a channel having a progressive radius, configured to receive cord 2 therein. This drum may be axially stationary (e.g., configured as drum 1A', discussed hereinabove), in which a tracking arm 38 may be used to guide cord 2 during winding/unwinding. Alternatively, drum 1A may be configured to move axially during rotation in order to provide an axially stationary entry/exit point 206 as also described hereinabove. The skilled artisan should recognize that all the drums shown and described herein, may be configured for being either axially movable, or axially stationary, without departing from the spirit and scope of the present invention.

Drum 1B has a helical path 204B defined by channels disposed within a cylindrical surface, which as such, are disposed at a uniform radius along the length of the drum. As such, this drum 1B does not provide for increasing torque as the cord 2 is extended and the spring wound against its bias.

Drum 1C is similar to drum 1B with the exception that path 204C includes a reduced radius portion at one end thereof, to provide the tool with an upward bias when the cord is fully wound, as discussed hereinabove.

Drum 1D has a frusto-conical helical path 204D, which is similar to path 204 of FIGS. 1 and 2, but is not defined by a channel.

Drum 1E is nominally identical to drum 1D, though having a cylindrical, rather than frusto-conical outer surface.

Drum 1F is configured so that cord 2 coils on top of itself to decrease the diameter as the cord 2 is unwound.

Drum 1G is similar to drum 1F, but uses a V-shaped exterior surface to reduce the rate of change of the effective radius as the cord winds and unwinds.

Although the foregoing embodiments have been shown and described using conventional torsion coil springs, the skilled artisan should recognize that substantially any type of biasing devices may be used, including other types of springs such as constant tension springs, clock springs, cantilevered springs, pneumatic devices, and the like, without departing from the spirit and scope of the present invention.

The following illustrative example is intended to demonstrate certain aspects of the present invention. It is to be understood that this example should not be construed as limiting.

EXAMPLE

A support assembly 200', substantially as shown and described in FIGS. 3–4 was fabricated, having the following parameters configured to weightlessly support an object weighing in a range of 1–3 pounds. This assembly was built according to the wing parameters:

---

Adjuster
Fiber reinforced ABS plastic using a spur gear with a 20° pressure angle.
Mandrel
Thin wall (.08") ABS plastic. 2.5" O.D. × 8.5" long
Spring
0.08" music wire with 80 Teflon-coated coils with a coil diameter of 3.5"
Torque converter
Delrin ® with 8 transfer grooves 9A and a 4.55" O.D.
Drum
ABS plastic with 0.4" diameter channel 204. The channel had a .5" lead (i.e., pitch, corresponding to .5" axial travel per rotation) and a 10° conical taper with a starting helical coil diameter of 5". Starting O.D. 5.7", starting I.D. 4.8". Ending O.D. 6.76", ending I.D. 5.86". Length is 3"
Thrust plate
Delrin ®, with threads to accept threaded rod.
Threaded Rod (Lead screw)
Teflon ® coated 303 stainless steel. Rolled threads have a .5" lead and 5 starts.
Conventional Slip-ring assembly capable of handling 15 to 20 amps.

---

This assembly was found to be capable of successfully supporting objects 208 within a range of 0.6 ounces to 4 lbs. It was also adjusted and successfully tested with a hairdryer weighing approximately 2 pounds, and found to have a 'drag' of 3 ounces (0.08 kg) or less.

In the preceding specification, the invention has been described with reference to specific exemplary embodiments thereof. It will be evident that various modifications and changes may be made thereunto without departing from the broader spirit and scope of the invention as set forth in the claims that follow. The specification and drawings are accordingly to be regarded in an illustrative rather than restrictive sense.

What is claimed is:

1. A multi-elevational hairdryer support comprising:
a frame configured for mounting to a ceiling;
a drum rotatably coupled to the frame for rotation about a central axis;
the drum having an exterior frusto-conical surface;
a helical channel extending along the frusto-conical surface;
a coiled spring disposed to bias rotation of the drum;
a cord coupled at a proximal end thereof to the drum;
a hairdryer coupled to a distal end of the cord;
the cord configured to supply electrical power to the hairdryer;
the helical channel configured to windingly receive the power cord therein;
the power cord configured for being alternately wound and unwound with and against the bias of the spring as the hairdryer is respectively raised and lowered;
the drum configured for moving axially during the alternate winding and unwinding;
an axially stationary entry and exit point through which the cord alternately exits and enters the helical channel during the alternate unwinding and winding;
the spring being coupled to the drum at an axially stationary location which is orthogonally aligned with the entry and exit point relative to the axis; and
the spring being configured for remaining axially stationary during the axial movement of the drum.

2. A low-drag counter-balance apparatus for offsetting a weight between two points of reference, over a range of movement, the points of reference respectively defining a point of attachment to the weight and an axis of rotation, the apparatus comprising:
a drum configured to rotate about the axis of rotation;
a spring operatively engaged with the drum to bias rotation of the drum;
the drum having a surface defining a helical path thereon;
a cord coupled at a proximal end thereof to the drum;
the cord coupled at a distal end thereof to the weight;
the cord configured to be alternately wound and unwound about the drum along the helical path during the rotation of the drum, respectively with and against the bias;
an entry/exit location where the cord alternately engages and disengages the drum during the winding and unwinding; and
the entry/exit point and the spring configured for being axially stationary relative to one another during the winding and unwinding.

3. The apparatus of claim 2, wherein the weight comprises a tool.

4. The apparatus of claim 3, wherein the tool is a hairdryer.

5. The apparatus of claim 3, wherein the tool is an electric razor.

6. The apparatus of claim 2, wherein the surface of the drum is frusto-conical.

7. The apparatus of claim 2, wherein the surface of the drum is cylindrical.

8. The apparatus of claim 6, wherein the helical path comprises a channel disposed within the frusto-conical surface.

9. The apparatus of claim 2, wherein:
the entry/exit point is configured for being axially stationary during the winding and unwinding.

10. The apparatus of claim 9, wherein the spring is configured for remaining axially stationary during the winding and unwinding.

11. The apparatus of claim 2, wherein a drum engagement portion of the spring is aligned with the entry/exit point in a direction orthogonal to the axis.

12. The apparatus of claim 11, further comprising a torque converter disposed between the drum and a drum engagement portion of the spring.

13. The apparatus of claim 12, wherein the torque converter is axially stationary.

14. The apparatus of claim 13, wherein the drum is axially slidably engaged with the torque converter.

15. The apparatus of claim 2, wherein the spring comprises a torsion spring.

16. The apparatus of claim 2, wherein the helical path comprises a helical channel.

17. The apparatus of claim 3 further comprising:
a tension adjuster coupled to the spring;
the tension adjuster configured to adjust the bias over a range of:
from 0% of the weight of the tool and cord;
to 100% of the weight of the tool and cord.

18. The apparatus of claim 17, wherein the drum is configured for being manually wound and unwound by a user engaging the tool.

19. The apparatus of claim 17, further comprising a motor assembly configured to automatically wind and unwind the drum.

20. The apparatus of claim 3, wherein the cord is configured to supply power to the tool.

21. The apparatus of claim 3, wherein the tool is configured to have six degrees of freedom of movement during operation of the apparatus.

22. The apparatus of claim 2, further comprising a motor assembly configured to adjust the tension of the spring.

23. The apparatus of claim 4, further comprising a switch to remotely turn the hairdryer on and off.

24. The apparatus of claim 2, further comprising a magnetic stop on the cord.

25. The apparatus of claim 24, where the magnetic stop is slidably adjustable as to its location on the cord.

26. The apparatus of claim 20, comprising an automatic power switch.

27. The apparatus of claim 26, wherein said automatic power switch is configured to turn power respectively on and off when said tool is moved out of and into a predetermined position within said range of movement.

28. The apparatus of claim 20, wherein the cord is configured to supply electrical power to the tool.

29. A low-drag multi-elevational hairdryer support comprising:
a frame configured for mounting to a ceiling;
a shaft disposed on the frame, the shaft defining an axis of rotation;
low-friction rolled threads disposed along a first portion of the shaft;
a substantially smooth low-friction spring support disposed concentrically with an other portion of the shaft;
the spring support having a lubricious outer surface configured to slidably support a spring concentrically disposed therewith;
a drum having an integral self-lubricating inner threaded bore;
the threaded bore disposed in rotational engagement with the low-friction rolled threads;
the drum having an exterior frusto-conical surface;
a helical path extending along the frusto-conical surface;
a coiled spring disposed to bias rotation of the drum;
the spring having a first number of coils concentrically superposed with the spring support;
the coils disposed in axially spaced relation to one another, wherein the coils are free from mutual engagement during rotation of the drum;
the helical path extending for a second number of revolutions about the drum;
a ratio of the first number of coils to the second number of revolutions being at least 11:1;
a cord coupled at a proximal end thereof to the drum;
a hairdryer coupled to a distal end of the cord;
the cord configured to supply electrical power to the hairdryer;
the helical path configured to windingly receive the cord thereon;
the cord configured for being alternately wound and unwound with and against the bias of the spring as the hairdryer is respectively raised and lowered; and
the support having a drag force opposing elevational movement of the hairdryer of less than 0.5 pounds (0.2 kg).

30. The apparatus of claim 29, wherein the drum is configured for moving axially during the alternate winding and unwinding.

31. The apparatus of claim 30, comprising an axially stationary entry and exit point through which the cord alternately exits and enters the helical path during the alternate unwinding and winding.

32. The apparatus of claim 30, wherein the helical path comprises a helical channel.

33. The apparatus of claim 31, wherein the spring is coupled to the drum at an axially stationary location which is orthogonally aligned with the entry and exit point relative to the axis.

34. The apparatus of claim 33, wherein the spring is configured for remaining axially stationary during the axial movement of the drum.

35. The apparatus of claim 29, wherein the spring is configured to move axially during the winding and unwinding.

36. The apparatus of claim 35, wherein the spring is configured to axially expand and contract during the winding and unwinding.

37. The apparatus of claim 36, wherein the spring is configured to axially expand during the winding, and to axially contract during the unwinding.

38. The apparatus of claim 29, wherein the ratio of the first number of coils to the second number of revolutions is up to 30:1.

39. A method for offsetting a weight between two points of reference, over a range of movement, the points of reference respectively defining a point of attachment to the weight and an axis of rotation, the method comprising:
(a) configuring a drum to rotate about the axis of rotation;
(b) operatively engaging a spring with the drum to bias rotation of the drum;
(c) providing a surface defining a helical path thereon;
(d) coupling a proximal end of the cord to the drum;
(e) configuring a distal end of the cord for coupling to the weight;
(f) configuring the cord for being alternately wound and unwound about the drum along the helical path during the rotation of the drum, respectively with and against the bias;
(g) providing an entry/exit location where the cord alternately engages and disengages the drum during the winding and unwinding; and
(h) configuring the entry/exit point and the spring for being axially stationary relative to one another during the winding and unwinding.

40. A multi-elevational hairdryer support comprising:
a drum disposed to rotate about a central axis;
a coiled spring disposed to bias rotation of the drum;
a cord coupled at a proximal end thereof to the drum;

a hairdryer coupled to a distal end of the cord;

the cord configured to supply electrical power to the hairdryer;

the drum configured to windingly receive the power cord thereabout;

the power cord configured for being alternately wound and unwound with and against the bias of the spring as the hairdryer is respectively raised and lowered;

the drum configured for moving axially during the alternate winding and unwinding;

an axially stationary entry and exit point through which the cord alternately exits and enters the helical channel during the alternate unwinding and winding;

the spring being coupled to the drum at an axially stationary location which is orthogonally aligned with the entry and exit point relative to the axis; and the spring being configured for remaining axially stationary during the axial movement of the drum.

41. The support of claim 40 comprising a frame configured for rotationally supporting the drum.

42. The hairdryer support of claim 41, wherein:

the drum includes an exterior frusto-conical surface;

a helical channel extends along the frusto-conical surface; and the helical channel is configured to windingly receive the power cord therein.

43. A multi-elevational tool support comprising:

a drum disposed to rotate about a central axis;

a coiled spring disposed to bias rotation of the drum;

a cord coupled at a proximal end thereof to the drum;

a tool coupled to a distal end of the cord;

the cord configured to supply electrical power to the tool;

the drum configured to windingly receive the power cord thereabout;

the cord configured for being alternately wound and unwound with and against the bias of the spring as the tool is respectively raised and lowered;

the drum configured for moving axially during the alternate winding and unwinding;

an axially stationary entry and exit point through which the cord alternately engages and disengages the drum during the alternate unwinding and winding;

the spring being coupled to the drum at an axially stationary location which is orthogonally aligned with the entry and exit point relative to the axis; and the spring being configured for remaining axially stationary during the axial movement of the drum.

44. A multi-elevational tool support comprising:

a drum disposed to rotate about a central axis;

a coiled spring disposed to bias rotation of the drum;

a cord coupled at a proximal end thereof to the drum;

a tool coupled to a distal end of the cord;

the cord configured to supply power to the tool;

the drum configured to windingly receive the power cord thereabout;

the cord configured for being alternately wound and unwound with and against the bias of the spring as the tool is respectively raised and lowered;

the drum configured for moving axially during the alternate winding and unwinding;

an axially stationary entry and exit point through which the cord alternately engages and disengages the drum during the alternate unwinding and winding;

the spring being coupled to the drum; and the spring being configured for remaining axially stationary during the axial movement of the drum.

* * * * *

UNITED STATES PATENT AND TRADEMARK OFFICE
CERTIFICATE OF CORRECTION

PATENT NO. : 6,805,314 B2
DATED : October 19, 2004
INVENTOR(S) : Michael B. Hopper Page 1 of 1

It is certified that error appears in the above-identified patent and that said Letters Patent is hereby corrected as shown below:

Column 18,
Line 36, please add Claim 45, as follows:

45. A low-drag multi-elevational tool support comprising:
a frame;
a shaft disposed on the frame, the shaft defining an axis of rotation;
low-friction threads disposed along a first portion of the shaft;
a spring support disposed concentrically with an other portion of the shaft;
the spring support having a lubricious outer surface configured to slidably support a spring concentrically disposed therewith;
a drum having a self-lubricating inner threaded bore;
the threaded bore disposed in rotational engagement with the low-friction threads;
the drum having an exterior surface providing for a helical path extending thereon;
a coiled spring disposed to bias rotation of the drum;
the spring having a first number of coils concentrically superposed with the spring support;
the helical path extending for a second number of revolutions about the drum;
a ratio of the first number of coils to the second number of revolutions being at least 11:1;
a cord coupled at a proximal end thereof to the drum;
a tool coupled to a distal end of the cord;
the helical path configured to windingly receive the cord thereon;
the cord configured for being alternately wound and unwound with and against the bias of the spring as the tool is respectively raised and lowered; and
the support having a drag force opposing elevational movement of the tool of less than 0.5 pounds (0.2kg).

Signed and Sealed this

Seventh Day of June, 2005

JON W. DUDAS
*Director of the United States Patent and Trademark Office*